US012679242B2

(12) United States Patent
Yoshida et al.

(10) Patent No.: US 12,679,242 B2
(45) Date of Patent: Jul. 14, 2026

(54) DISPLAY SYSTEM

(71) Applicant: TOYOTA JIDOSHA KABUSHIKI KAISHA, Toyota (JP)

(72) Inventors: Hiroshi Yoshida, Anjo (JP); Takashi Ogura, Seto (JP); Yuki Sugo, Seto (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 22 days.

(21) Appl. No.: 18/926,643

(22) Filed: Oct. 25, 2024

(65) Prior Publication Data

US 2025/0135944 A1 May 1, 2025

(30) Foreign Application Priority Data

Nov. 1, 2023 (JP) ................................. 2023-187615

(51) Int. Cl.
*B60L 50/10* (2019.01)
*B60L 58/12* (2019.01)

(52) U.S. Cl.
CPC ......... *B60L 58/12* (2019.02); *B60L 2240/545* (2013.01); *B60L 2240/547* (2013.01); *B60L 2240/549* (2013.01); *B60L 2250/16* (2013.01)

(58) Field of Classification Search
USPC ....................................................... 701/22
See application file for complete search history.

(56) References Cited

U.S. PATENT DOCUMENTS

| | | | | |
|---|---|---|---|---|
| 5,773,962 A | * | 6/1998 | Nor ......................... | H02J 7/663 |
| | | | | 320/122 |
| 6,424,157 B1 | * | 7/2002 | Gollomp ................. | B60L 58/12 |
| | | | | 324/426 |
| 8,736,232 B2 | * | 5/2014 | Nakatsuji ............. | G01R 31/367 |
| | | | | 320/132 |
| 10,160,340 B2 | * | 12/2018 | Lindemann ............. | B60L 58/16 |
| 11,444,338 B1 | * | 9/2022 | Dhawan .............. | H01M 50/569 |
| 11,772,512 B2 | * | 10/2023 | Hashimoto ............. | B60L 58/16 |
| | | | | 307/10.1 |
| 2004/0018419 A1 | * | 1/2004 | Sugimoto ......... | H01M 10/4257 |
| | | | | 429/61 |
| 2005/0225295 A1 | * | 10/2005 | Sato .......................... | G06F 1/28 |
| | | | | 320/132 |
| 2010/0156355 A1 | * | 6/2010 | Bauerle ................... | B60L 3/003 |
| | | | | 320/152 |

(Continued)

FOREIGN PATENT DOCUMENTS

| | | |
|---|---|---|
| JP | 2005-315825 A | 11/2005 |
| WO | 2014/046232 A1 | 3/2014 |

*Primary Examiner* — Jonathan L Sample
(74) *Attorney, Agent, or Firm* — SoraIP, Inc.

(57) ABSTRACT

The display system includes an instrument panel, a battery, a current sensor, and an ECU. The battery stores electric power for traveling of the vehicle. The current sensor detects a charge/discharge current of the battery. ECU calculates SOC of the battery according to the current sensor. SOC includes a control SOC used for charge/discharge control of the battery, and a display SOC displayed on the instrument panel and calculated according to the control SOC. When the index value indicating the degree of decrease in the calculation accuracy of the control SOC exceeds the threshold value, ECU starts a calculation process of calculating the display SOC lower than the control SOC.

9 Claims, 5 Drawing Sheets

(56)         References Cited

U.S. PATENT DOCUMENTS

| | | | |
|---|---|---|---|
| 2012/0112754 A1* | 5/2012 | Kawai | B60L 58/16 |
| | | | 324/427 |
| 2014/0303820 A1* | 10/2014 | Aoki | B60W 10/08 |
| | | | 180/65.265 |
| 2015/0212161 A1* | 7/2015 | Soga | G01R 31/382 |
| | | | 702/63 |
| 2018/0188332 A1* | 7/2018 | Newman | B60K 35/10 |
| 2018/0358663 A1* | 12/2018 | Yonemoto | B60W 20/13 |
| 2019/0168739 A1* | 6/2019 | Morisaki | B60W 10/08 |
| 2022/0219671 A1* | 7/2022 | Ogawa | B60W 10/26 |

* cited by examiner

DISPLAY SYSTEM

CROSS-REFERENCE TO RELATED APPLICATION

This application claims priority to Japanese Patent Application No. 2023-187615 filed on Nov. 1, 2023, incorporated herein by reference in its entirety.

BACKGROUND

1. Technical Field

The present disclosure relates to a display system.

2. Description of Related Art

WO 2014/046232 discloses a charge state calculation device. The device includes a charge state calculator, a full-charge detector, and a correction value calculator. The charge state calculator calculates a charge state of a battery. The full-charge detector detects full charge of the battery. The correction value calculator calculates a correction value for correcting a result of calculation of the charge state when the full charge of the battery is detected. The correction value calculator updates the correction value only when the full charge of the battery is detected, and holds the updated correction value until the next full charge.

SUMMARY

The charge state of a power storage device such as a battery is generally represented by "state of charge (SOC)". The SOC of the power storage device mounted on an electrified vehicle is basically calculated in accordance with a detection value from a current sensor that detects a charge/discharge current of the power storage device. The calculated SOC may be displayed on a display device of the vehicle.

The accuracy of calculation of the SOC may decrease over time due to integration of detection deviations (e.g., offset deviations) of the current sensor. As a result, the displayed SOC no longer accurately reflects the actual charge state of the power storage device. Even when the power storage amount of the power storage device decreases, the user cannot accurately recognize the decrease. Although the user recognizes that the power storage amount of the power storage device has not decreased yet, the power storage amount may decrease to zero earlier than expected, and an unexpected failure (e.g., lack of electricity) may occur in the electrified vehicle. According to the technology of WO 2014/046232, the SOC can be corrected only when the power storage device is fully charged. If the power storage device is not fully charged for a long time, however, the SOC is not appropriately corrected and the accuracy of calculation of the SOC may decrease. As a result, there is a possibility that the above failure cannot be prevented.

The present disclosure provides a display system that can prevent an unexpected failure in an electrified vehicle due to a decrease in accuracy of calculation of an SOC.

A display system of the present disclosure includes:
a display device;
a power storage device configured to store electric power for traveling of an electrified vehicle;
a current sensor configured to detect charging and discharging currents of the power storage device; and a processor configured to calculate a state of charge of the power storage device based on a detection value of the current sensor.

The state of charge includes a control state of charge to be used for charge and discharge control on the power storage device, and a display state of charge calculated based on the control state of charge and displayed on the display device.

The processor is configured to, when an index value indicating a degree of decrease in accuracy of calculation of the control state of charge exceeds a threshold value, start a calculation process for calculating the display state of charge lower than the control state of charge.

With the above configuration, when the accuracy of calculation of the control state of charge decreases, the display state of charge is calculated as a value lower than the control state of charge and displayed on the display device. As a result, the display state of charge approaches zero earlier than the actual state of charge of the power storage device. This motivates a user of the electrified vehicle to charge the power storage device early. Thus, it is possible to prevent an unexpected failure such as lack of electricity in the electrified vehicle.

The display system may further include
a storage device configured to store a relationship between the control state of charge and an open circuit voltage of the power storage device.

The processor may be configured to correct the control state of charge using the relationship when the control state of charge is equal to or larger than a first reference value or when the control state of charge is smaller than a second reference value that is smaller than the first reference value.

The index value may be calculated based on an elapsed time since the control state of charge was previously corrected using the relationship.

The accuracy of calculation of the control state of charge is more likely to decrease as the elapsed time from the previous correction of the control state of charge increases. Therefore, this elapsed time can appropriately reflect the degree of decrease in the accuracy of calculation of the control state of charge. With the above configuration, the index value is calculated based on the elapsed time. Thus, it is possible to appropriately determine the decrease in the accuracy of calculation of the control state of charge based on the index value.

A difference between the control state of charge and the display state of charge may increase as the elapsed time increases.

With the above configuration, the display state of charge is even smaller than the control state of charge as the elapsed time increases (the accuracy of calculation of the control state of charge decreases). Therefore, even when the accuracy of calculation of the control state of charge decreases greatly, the display state of charge smaller than the actual state of charge of the power storage device is displayed securely. As a result, the above failure can be prevented more securely.

The processor may be configured to, when the elapsed time exceeds a threshold time, perform a display process for causing the display device to display a screen that prompts a user of the electrified vehicle to fully charge the power storage device.

With the above configuration, the user is prompted to fully charge the power storage device. When the power storage device is fully charged, the control state of charge is equal to or larger than the first reference value, and therefore the control state of charge is corrected. Thus, even if the accuracy of calculation of the control state of charge decreases, the control state of charge returns to the original state. As a result, the above failure can be prevented more effectively.

The index value may include a temperature of the power storage device. A state in which the index value exceeds the threshold value may include a state in which the temperature is lower than a threshold temperature serving as the threshold value.

The accuracy of calculation of the control state of charge is more likely to decrease as the temperature of the power storage device decreases. Therefore, this temperature can appropriately reflect the degree of decrease in the accuracy of calculation of the control state of charge. With the above configuration, the index value is determined based on the temperature of the power storage device. Thus, it is possible to appropriately determine the decrease in the accuracy of calculation of the control state of charge based on the index value.

According to the present disclosure, it is possible to prevent the unexpected failure in the electrified vehicle due to the decrease in the accuracy of calculation of the state of charge.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
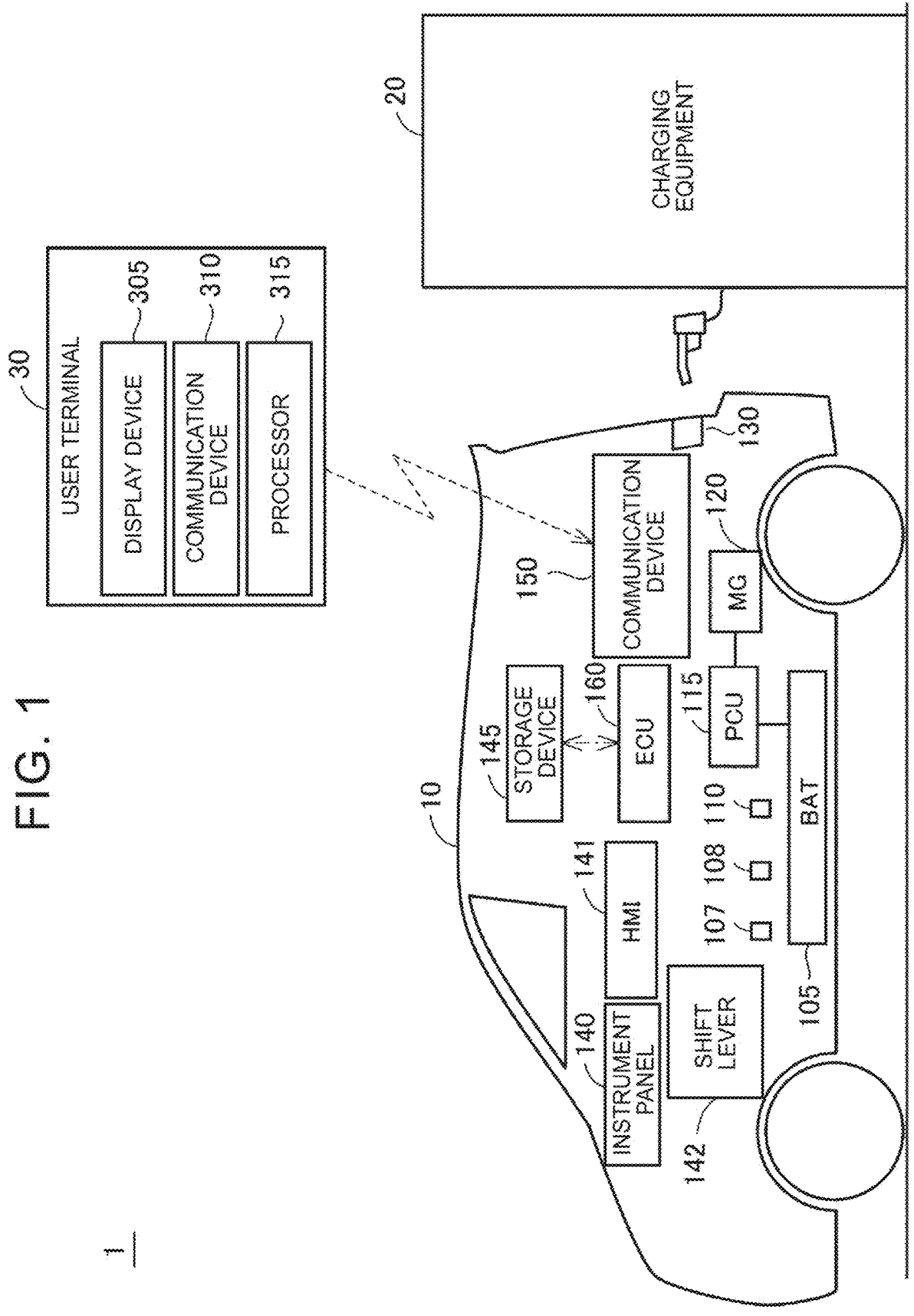
FIG. 1 is a diagram for describing a configuration of a processing system on which a display system according to a first embodiment is mounted.

Hereinafter, an embodiment of the present disclosure will be described in detail with reference to the drawings. The same or corresponding parts in the drawings are denoted by the same reference numerals, and the description thereof will not be repeated. Each of the embodiments and the modification examples thereof may be combined with each other as appropriate.

First Embodiment

FIG. 1 is a diagram for describing a configuration of a processing system in which a display system according to a first embodiment is mounted. Referring to FIG. 1, the processing system 1 includes a vehicle 10, a charging facility 20, and a user terminal 30.

The vehicle 10 is an electrified vehicle, in this case a battery electric vehicle (BEV). The vehicle 10 includes a battery 105, a current sensor 107, a voltage sensor 108, a temperature sensor 110, a Power Control Unit (PCU) 115, and a Motor Generator (MG) 120. The vehicle 10 further includes an inlet 130 and an instrument panel 140. Vehicle 10 further includes a Human Machine Interface (HMI) device 141, a shift lever 142, a storage device 145, a communication device 150, and an Electronic Control Unit (ECU) 160.

The battery 105 stores electric power for traveling by the vehicle 10. Battery 105 may be replaced by other types of power storage devices, such as electric double layer capacitors.

The current sensor 107 detects a charge/discharge current of the battery 105. The voltage sensor 108 detects a voltage of the battery 105. The temperature sensor 110 detects the temperature of the battery 105.

PCU 115 is connected to the battery 105 and includes inverters (not shown). The inverters receive the discharged electric power (DC electric power) from the battery 105, convert the DC electric power into AC electric power, and supply the AC electric power to MG 120. PCU 115 is used for charge/discharge control of the battery 105. MG 120 receives AC power from PCU 115 and generates a driving force for driving the vehicle 10. During regenerative braking of the vehicle 10, MG 120 may function as a generator (regenerative power generation). PCU 115 (inverter) is also configured to convert AC power generated by MG 120 into DC power and to provide the DC power to the battery 105 as the charge power of the battery 105.

The inlet 130 is configured to receive power supplied from the charging facility 20. This power supply is used for external charging of the vehicle 10. The external charging is to charge the battery 105 using the supplied power. The power supply is DC power in this example, and is supplied from the charging facility 20 to the battery 105 through the inlet 130. The charging facility 20 includes a charging start button (not shown) for the user to instruct the start of external charging. This button is pressed while the connector of the charging facility 20 is inserted into the inlet 130.

The instrument panel 140 functions as a display device that displays various state values of the vehicle 10, such as measured values of various meters of the vehicle 10. The status value includes a value of the traveling velocity of the vehicle 10 and an SOC of the battery 105.

The HMI device 141 is a touch screen and includes an inputting device and a displaying device (neither of which is shown). The input device receives an operation (user operation) by the user of the vehicle 10. The display device displays various screens. The screen may be a car navigation screen or a screen representing an SOC.

The shift lever 142 is configured to be able to switch the shift range of the vehicle 10 in accordance with a user operation. The shift range includes an N (neutral) range, an R (reverse) range, a D (drive) range, a P (parking), and a B (brake) range.

The storage device 145 stores various types of data. This data includes a map indicating a correspondence between Open Circuit Voltage (OCV) of the battery 105 and SOC. The communication device 150 wirelessly communicates with the user terminal 30 by short-range communication or the like. The communication device 150 is also configured to exchange various kinds of information (for example, information indicating pressing of a charging start-button by a user) with the charging facility 20 by, for example, Controller Area Network (CAN) communication.

ECU 160 includes memories and processors (none of which are shown). The memories include Read Only Memory (ROM) and Random Access Memory (RAM). ROM stores a program to be executed by the processor. RAM functions as a working memory. The processor is, for example, a Central Processing Unit (CPU), and executes various arithmetic processes in accordance with the above-described programs.

ECU 160 controls various devices of the vehicle 10. ECU 160 controls, for example, PCU 115, and thereby performs charge/discharge control of the battery 105. ECU 160 controls PCU 115 so that the discharging power of the battery 105 is limited when SOC of the battery 105 is excessively lowered. Accordingly, the traveling speed (traveling acceleration) of the vehicle 10 is limited.

ECU 160 receives information indicating an operation result of the shift lever 142 and information including a detection value of various sensors. ECU 160 also functions as a processor that executes various kinds of processing according to these pieces of information. In one embodiment, ECU 160 calculates SOC by the Coulomb count method according to the detected value (specifically, the integrated value of the detected value) of the current sensor 107. The calculated SOC is used to control charging and discharging of the battery 105. ECU 160 is also configured to calculate (correct) SOC in accordance with the detected value of the voltage sensor 108. This point will be described in detail later.

ECU 160 starts external charging by transmitting a charging start command to the charging facility 20 through the communication device 150. This command is transmitted in response to the user pressing the charge start button. When SOC reaches the target SOC during external charging, a charging stopping command is transmitted to the charging facility 20 through the communication device 150. As a result, the external charging is stopped. The target SOC is, for example, 80%.

ECU 160 is also configured to estimate the full charge capacity of the battery 105 by dividing the charge amount (ΔAh) of the battery 105 during external charging by the increment (ΔSOC) of SOC during external charging. ΔAh is calculated according to a detection value of the current sensor 107.

The user terminal 30 is, for example, a smartphone, and is carried by a user of the vehicle 10. The user terminal 30 includes a display device 305, a communication device 310, and a processor 315. The display device 305 displays various screens. The communication device 310 communicates with the vehicle 10. The processor 315 controls the display device 305 and the communication device 310 and executes various kinds of arithmetic processing.

Figure 2:
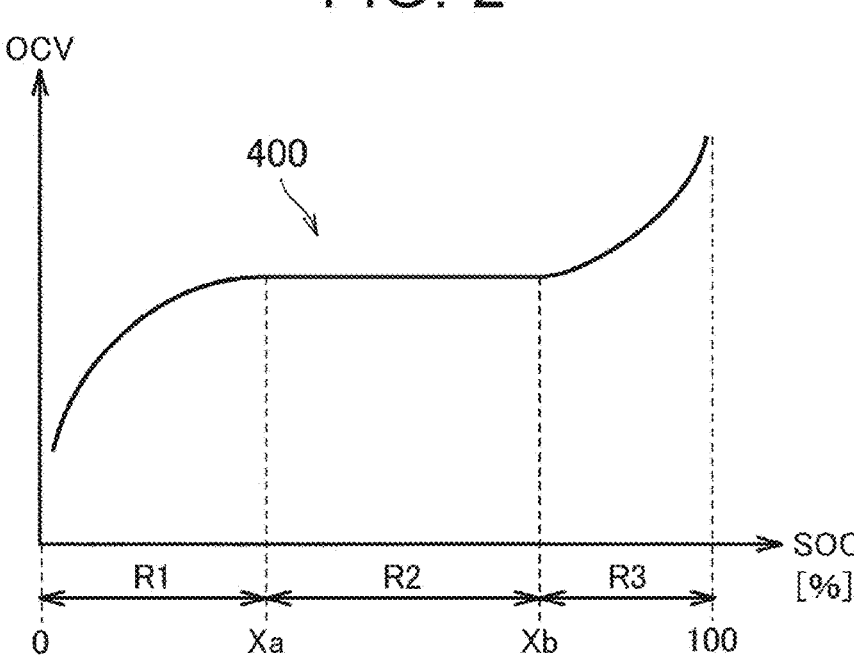
FIG. 2 is a diagram illustrating an example of a map stored in a storage device.

FIG. 2 is a diagram illustrating an example of a map stored in the storage device 145. Referring to FIG. 2, a map 400 represents a correspondence relation (SOC-OCV curve) between an SOC and an OCV. Each of the ranges R1, R2, R3 represents an SOC range.

The range R1 is defined as a range in which SOC is 0 or more and less than Xa. The range R2 is defined as a range in which SOC is greater than or equal to Xa and less than Xb (Xb>Xa). The range R3 is defined as a range in which SOC is greater than or equal to Xb and less than or equal to 100. Each of the ranges R1, R3 is an SOC range in which the rate of change of OCV with respect to SOC in the map 400 is equal to or greater than a predetermined rate of change. The range R2 is an SOC range in which the change rate is less than the predetermined change rate. Xb corresponds to an exemplary "first reference value" of the present disclosure. Xa corresponds to an exemplary "second reference value".

ECU 160 uses the map 400 to calculate SOC according to OCV of the voltage sensor 108. When SOC is within the range R1 or the range R3, the slope of the curve is relatively steep. Therefore, ECU 160 can accurately calculate SOC using the map 400. On the other hand, when SOC is within the range R2, the slope of the curve is relatively flat. Therefore, ECU 160 cannot accurately calculate SOC using the map 400.

Therefore, ECU 160 basically calculates SOC by the Coulomb count method according to the detected value of the current sensor 107. As a result, the calculation accuracy of SOC can be improved as compared with the comparative example in which SOC is calculated using SOC-OCV curve at all times. On the other hand, when SOC is within the range R1 or the range R3, ECU 160 corrects SOC using the map 400 at a predetermined timing. Specifically, ECU 160 corrects SOC by substituting the calculated value of SOC by the Coulomb count method with the calculated value of SOC using the map 400. The predetermined timing when SOC is within the range R1 is, for example, when the battery 105 is fully charged by the external charge.

When SOC is calculated by the Coulomb count method as described above, the calculation result of SOC is influenced by the integrated value of the detection error (for example, the offset error) of the current sensor 107. In particular, if the duration over which SOC is calculated as described above without being corrected using the map 400 is prolonged, the integrated value of the detected error may be increased to a degree that is not negligible, and the calculation accuracy of SOC may be greatly reduced.

Consequently, SOC of the battery 105 displayed on the display device, such as the instrument panel 140 or the HMI device 141, no longer accurately reflects the actual charge status of the battery 105. Then, even when the amount of electric power stored in the battery 105 is decreasing, the user cannot accurately recognize that. In this case, although the user recognizes that the amount of electric power stored in the battery 105 has not yet decreased, the amount of electric power stored may decrease to zero earlier than expected, and the lack of electric power in the vehicle 10 may be unexpectedly caused.

In the first embodiment, in a case where such a possibility is predicted, ECU 160 calculates a display SOC separately from SOC (hereinafter, also referred to as a "control SOC") described so far. As described above, the control SOC is used for charge/discharge control of the battery 105. The display SOC is calculated in accordance with the control SOC when the calculation accuracy of the control SOC decreases, and is displayed on a display device such as the instrument panel 140 or the HMI device 141. Specifically, the display SOC is calculated to be lower than the control SOC. The above-described case corresponds to a case in which the index value indicating the degree of decrease in the calculation accuracy of the control SOC exceeds a predetermined threshold value. In other words, in the first embodiment, ECU 160 starts a calculation process of calculating the display SOC lower than the control SOC when the index value exceeds the threshold value. This process is also referred to as a "display SOC calculation process". Note that the control SOC is displayed on the display device as it is, assuming that the calculation accuracy of the control SOC is not significantly reduced prior to the beginning of this process.

According to the display SOC calculation process, when the calculation accuracy of the control SOC is deteriorated, the display SOC is calculated as lower than the control SOC and displayed on the display device. Consequently, as long as the display SOC is lower than the actual SOC, the display SOC approaches zero earlier than the actual SOC of the battery 105. This motivates the user of the vehicle 10 to perform external charging earlier than usual in order to prevent blackout. Therefore, it is possible to effectively prevent unexpected power shortage of the vehicle 10 caused by a decrease in the calculation accuracy of the control SOC. In this way, the display SOC calculation process is useful for a fail-safe function for preventing power shortage of the vehicle 10.

The index is preferably calculated according to the elapsed time since the control SOC was previously corrected using the map 400. In this case, the index value is calculated by ECU 160 as a percentage [%] of the multiplication value of the length of the elapsed time and the largest value of the offset error of the current sensor 107 with respect to the full charge capacity of the battery 105. This value is calculated as indicating the largest value of the error resulting from the calculation of the control SOC using the current sensor 107. The largest value of the offset error is determined in advance depending on the current sensor 107, and is stored in the memories of ECU 160. The index value exceeding the threshold value corresponds to the elapsed time exceeding a predetermined threshold time as the threshold value.

As the elapsed time is longer, the effect of the integrated value of the detected error on the calculation result of the control SOC is larger, so that the calculation accuracy of the control SOC is more likely to be lowered. Therefore, this elapsed time can appropriately reflect the degree of decrease in the calculation accuracy of the control SOC. With the above configuration, the index value is determined according to the elapsed time (for example, the longer the elapsed time, the larger the index value). Accordingly, ECU 160 can appropriately determine a decrease in the calculation accuracy of the control SOC according to the index.

Figure 3:
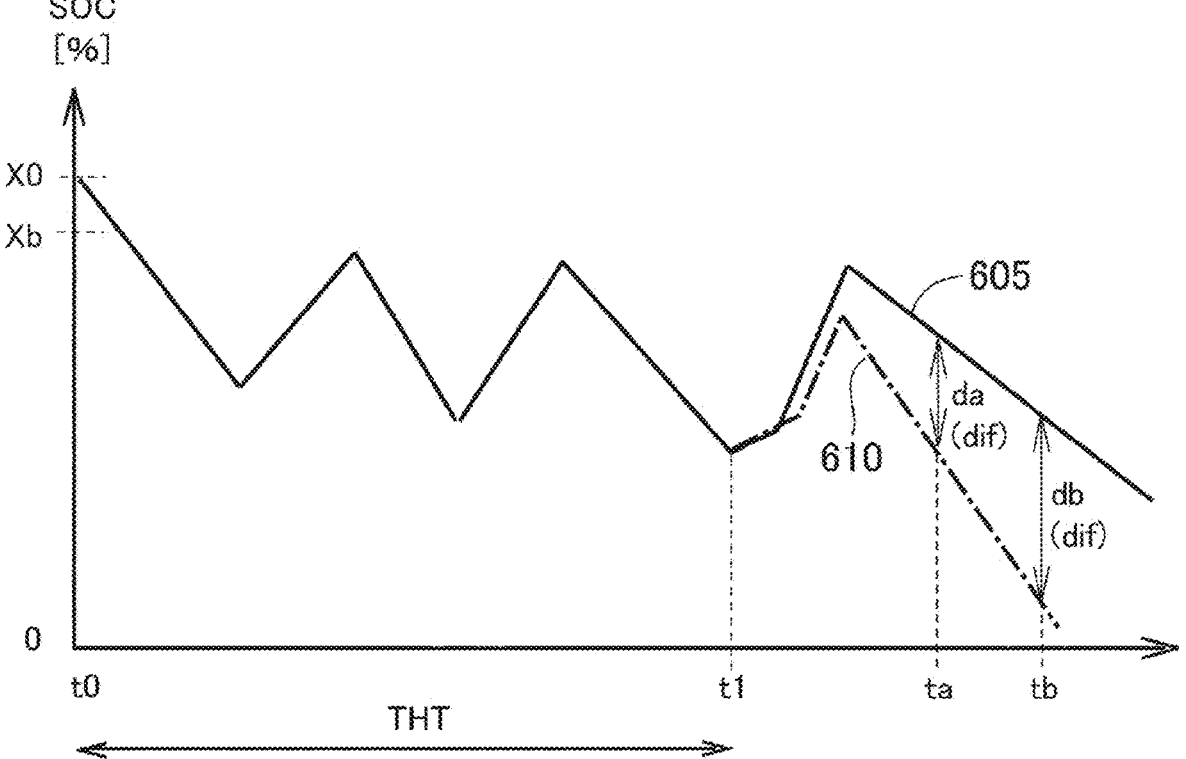
FIG. 3 is a diagram illustrating an exemplary transition of a control SOC and a display SOC.

FIG. 3 is a diagram illustrating an exemplary transition of the control SOC and the display SOC. Referring to FIG. 3, a line 605 represents a transition of the control SOC. A line 610 represents a transition of the display SOC.

In the time t0, it is assumed that the control SOC is X0 (>Xb) and is corrected using the map 400. X0 is, for example, 100%. During the period from the time to to the time t1, since the elapsed time from the time to does not exceed the threshold time THT, the index value does not exceed the threshold value.

In the time t1, the elapsed time from the time to exceeds the threshold time THT. As a result, since the index value exceeds the threshold value, ECU 160 starts the display SOC calculation process. After the time t1, ECU 160 calculates the display SOC while continuously calculating the control SOC.

ECU 160 preferably calculates the display SOC such that the magnitude of the difference dif between the control SOC and the display SOC increases as the elapsed time from the time to increases. In this embodiment, the magnitude of the difference dif at the time tb (db) is larger than the magnitude of the difference dif at the time ta (da).

For example, ECU 160 calculates the display SOC such that the magnitude of the difference dif is determined by multiplying the offset error of the current sensor 107 by the length of the elapsed time. ECU 160 may calculate the display SOC such that the magnitude of the difference dif is determined by multiplying the offset error by the length of the elapsed time from the time t1 (the elapsed time from the time t0 minus the threshold time THT). Accordingly, it is possible to avoid a situation in which SOC displayed on the display device suddenly decreases when the index value exceeds the threshold value. The magnitude of the difference dif may be determined in accordance with the control SOC or may be determined in accordance with the integrated value of the detected value of the current sensor 107.

When the display SOC is calculated as described above, as indicated by the line 605,610, the display SOC becomes lower with respect to the control SOC as the elapsed time from the time to becomes longer (as the calculation accuracy of the control SOC decreases). Thus, even when the calculation accuracy of the control SOC is greatly reduced after a long period of time has elapsed since the time to, the display SOC is surely displayed lower than the actual SOC of the battery 105. As a result, the user of the vehicle 10 can be motivated more effectively to perform external charging earlier than usual. Therefore, it is possible to reliably prevent the electric power shortage of the vehicle 10 caused by the decrease in the calculation accuracy of the control SOC.

Figure 4:
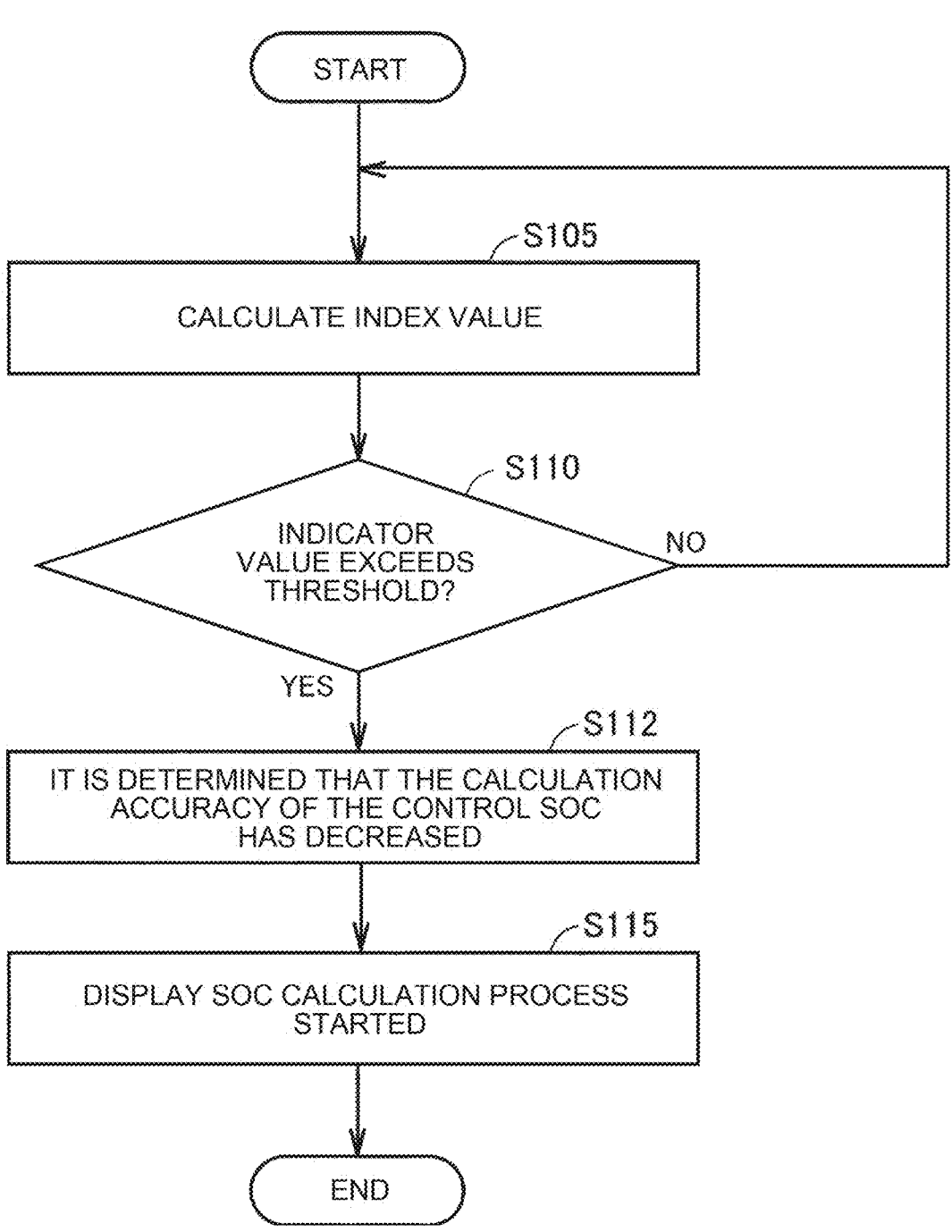
FIG. 4 is a flow chart illustrating an exemplary process executed by ECU in the first embodiment.

FIG. 4 is a flow chart illustrating an exemplary process executed by ECU 160 in the first embodiment. This flow chart is started when the correction of the control SOC is completed.

Referring to FIG. 4, ECU 160 calculates the index according to the elapsed time from the time when the control SOC is corrected last time (e.g., time t0) (S105).

ECU 160 determines whether the index value exceeds a threshold (S110). If the index value has not yet exceeded the threshold (NO in S110), the process returns to S105. When the index value exceeds the threshold value (YES in S110), ECU 160 determines that the calculation accuracy of the control SOC has decreased (S112), and starts the display SOC calculation process (S115). Thereafter, the process ends.

As described above, according to the first embodiment, SOC calculated by ECU 160 according to the detection value of the current sensor 107 includes the control SOC and the display SOC. When the index value exceeds the threshold value, ECU 160 starts a display SOC calculation process of calculating the display SOC lower than the control SOC. Accordingly, when the calculation accuracy of the control SOC is deteriorated, the user is motivated to perform the external charge earlier than normal. Therefore, it is possible to prevent unexpected power shortage of the vehicle 10 caused by a decrease in the calculation accuracy of the control SOC.

First Modification Example of First Embodiment

If the index value exceeds the threshold (e.g., at time t1 of FIG. 3), ECU 160 may perform a screen display process for displaying a screen on the display device that prompts the user to fully charge the battery 105.

With such a configuration, the user is prompted to perform external charging so as to fully charge the battery 105. When the battery 105 is fully charged, the actual SOC is 100%, and the calculated control SOC is basically equal to or larger than Xb (FIG. 2), so that the control SOC is corrected by ECU 160. Thus, even if the calculation accuracy of the control SOC is deteriorated, the process returns to the original state. As a consequence, it is possible to more effectively prevent unexpected power shortage of the vehicle 10 caused by a decrease in the calculation accuracy of the control SOC.

Figure 5A:
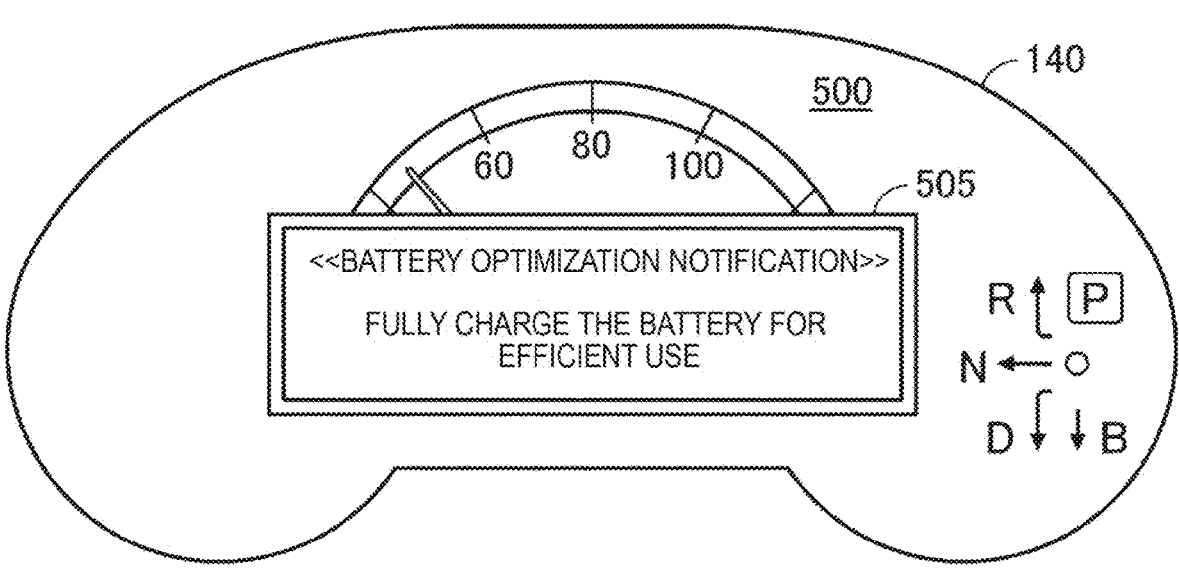
FIG. 5A is a diagram illustrating an example of a screen displayed on a display device.
Figure 5B:
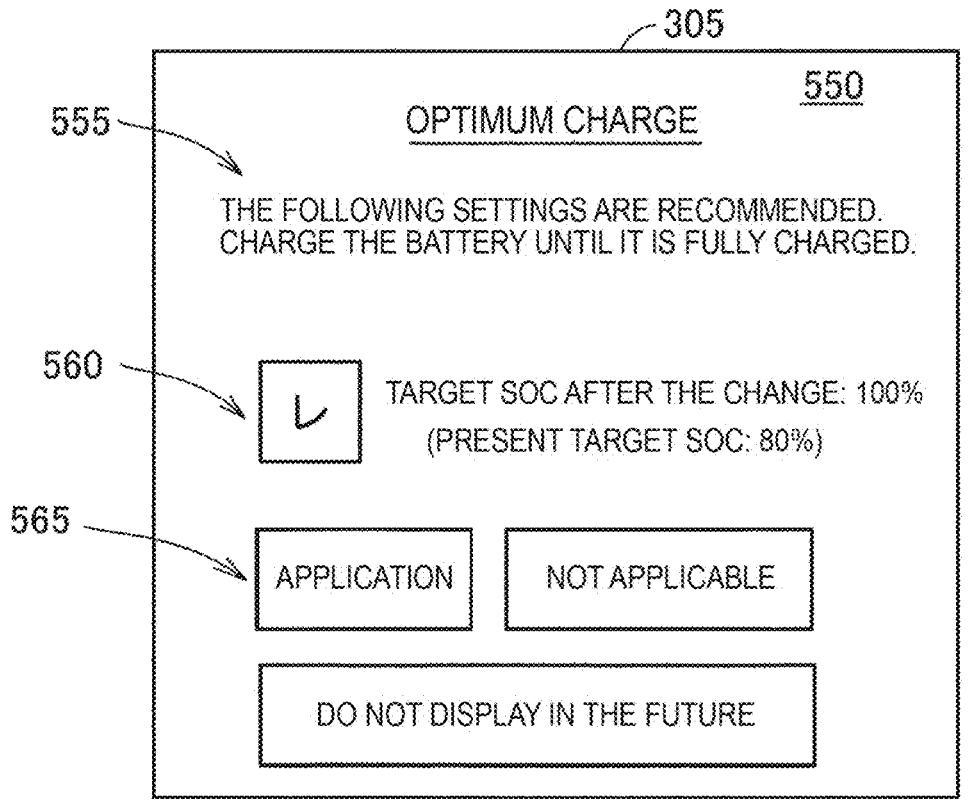
FIG. 5B is a diagram illustrating an example of a screen displayed on the display device.

FIGS. 5A and 5B are diagrams illustrating exemplary screens displayed on a display device. In the example of FIG. 5A, the display device is an instrument panel 140. The screen display process corresponds to ECU 160 controlling the instrument panel 140 to display the screen 500. The screen 500 includes a message 505. The message 505 prompts the user to perform external charging to fully charge the battery 105.

In the example of FIG. 5B, the display device is the display device 305 of the user terminal 30. In this example, the screen display process corresponds to transmitting a display command to the user terminal 30 through the communication device 150 so as to display the screen 550. The processor 315 of the user terminal 30 receives the display command through the communication device 310, and controls the display device 305 to display the screen 550 in response to the display command.

The screen 550 includes a message 555, a checkbox 560, and a button 565. Message 555, similar to message 505, prompts the user to fully charge the battery 105. The checkbox 560 is activated by the user to raise the target SOC at the time of the next external charge. In this case, the target SOC is increased from 80% to 100% due to user manipulation. The button 565 is operated by the user to apply the target SOC after the pull-up.

The screen 550 may be displayed on the HMI device 141 instead of the display device 305 of the user terminal 30. Here, ECU 160 controls the HMI device 141 to display the screen 550 based on the index value exceeding the threshold value. As described above, the screen display process may be to control the HMI device 141 to display the screen 550.

When the index value exceeds the threshold value while the vehicle 10 is traveling, ECU 160 preferably executes the display SOC calculation process and the screen display process at the same time. For example, the screen 500 or the screen 550 is preferably displayed immediately when the index value exceeds the threshold value (time t1 in FIG. 3). Before describing the benefits when these processes are executed at the same time, cases A, B where these processes are executed at different timings will be described below.

In the case A, when the index value exceeds the threshold value while the vehicle 10 is traveling, the display SOC calculation process is started prior to the screen display process. After the start of the display SOC calculation process (specifically, during the period from the start of the process to the start of the screen display process), the user may feel that the amount of electric power stored in the battery 105 is likely to be reduced. The user may misunderstand that this is due to degradation of the battery 105 or the like.

In the case B, unlike the case A, when the index value exceeds the threshold value while the vehicle 10 is traveling, the display SOC calculation process is started after the screen display process. Since it is difficult to perform external charging while the vehicle 10 is traveling, it may be preferable that the screen display process be postponed to the end of traveling of the vehicle 10 (for example, when the shift lever 142 is switched to the P range). Then, in the case B, there is a possibility that the display SOC calculation process is postponed until the next traveling time of the vehicle 10. As a result, the timing at which the user is prompted to fully charge the battery 105 may also be delayed. This may delay the timing at which the control SOC is corrected.

On the other hand, as described above, by executing the display SOC calculation process and the screen display process at the same time, it is possible to avoid the inconvenience caused in the cases A, B.

Figure 6:
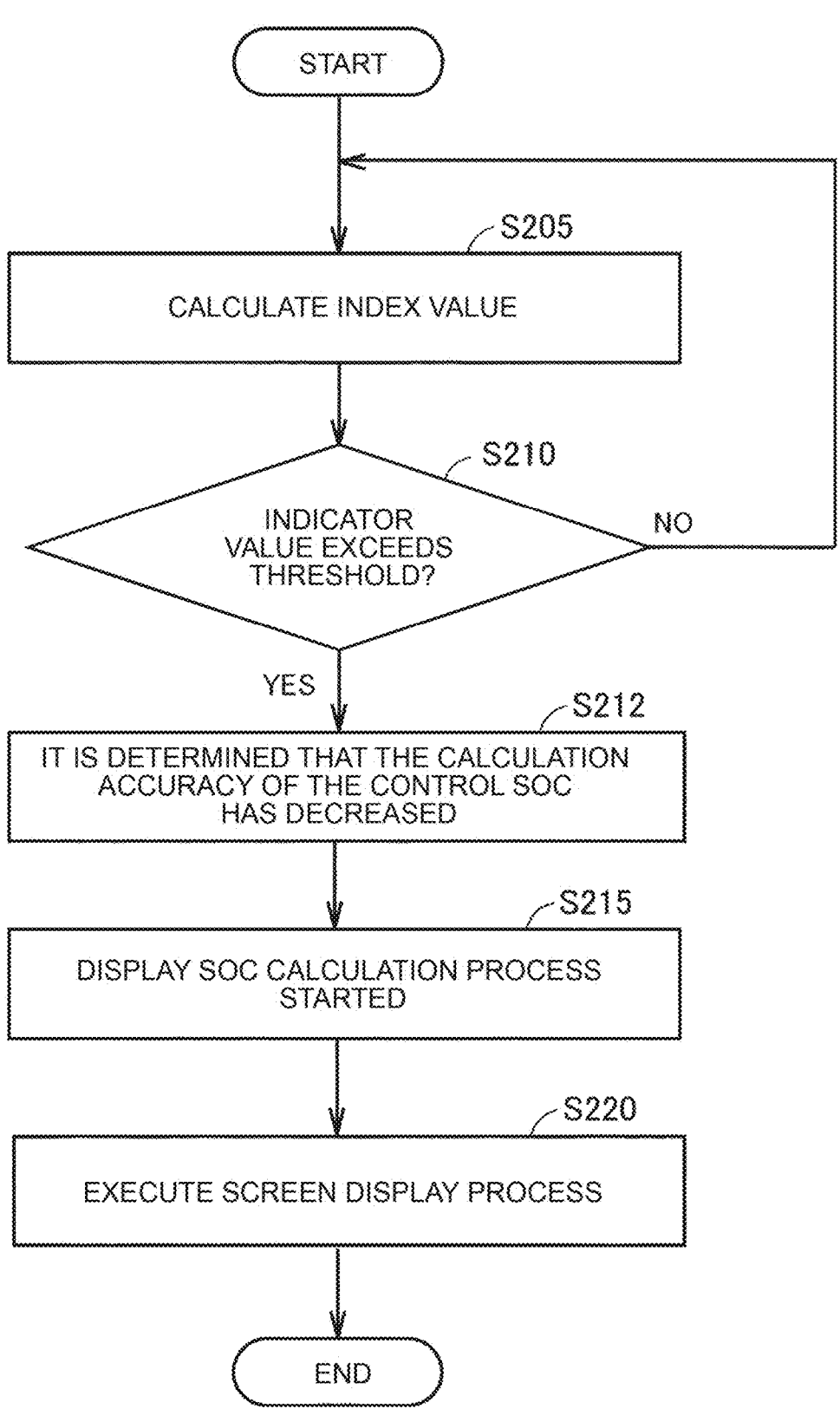
FIG. 6 is a flow chart illustrating an example of a process executed by ECU in a modification example of the first embodiment.

FIG. 6 is a flow chart illustrating an example of a process executed by ECU 160 in this modification example. Referring to FIGS. 6, S205 to S215 are the same as S105 to S115 (FIG. 4) of the first embodiment, respectively. The flow chart of FIG. 6 differs from the flow chart of FIG. 4 in that a S220 is added.

ECU 160 starts a display SOC calculation process (S215) and simultaneously executes a screen display process (S220). In other words, S215, S220 are executed simultaneously. Thereafter, the process ends.

As described above, according to this modification example, ECU 160 is further configured to execute a screen display process for displaying a screen such as the screen 500 on the display device. This prompts the user to perform external charging so as to fully charge the battery 105. As a consequence, it is possible to more effectively prevent unexpected power shortage caused by a decrease in the calculation accuracy of the control SOC.

Second Modification Example of First Embodiment

Although it is most preferable that ECU 160 simultaneously executes the display SOC calculation process and the screen display process, the display SOC calculation process may be started prior to the screen display process, as in case A. For example, ECU 160 starts the display SOC calculation process immediately when the index value exceeds the threshold value while the vehicle 10 is traveling, and executes the screen display process when the vehicle 10 is traveling. By executing these processes in this way, it is possible to avoid the inconvenience caused in the case B.

Alternatively, ECU 160 may initiate the display SOC calculation process after the screen display process, as in case B. For example, even if the index value exceeds the threshold value while the vehicle 10 is traveling, ECU 160 does not initiate the display SOC calculation process and executes the screen display process when the vehicle 10 finishes traveling. Then, ECU 160 starts the display SOC calculation process at the start of the next travel (when the shift lever 142 is switched from the P range to the D range). By executing these processes in this way, it is possible to avoid the inconvenience caused in the case A.

Second Embodiment

The index value may be a temperature of the battery 105 (a detection value of the temperature sensor 110). In the second embodiment, the index value exceeding the threshold value corresponds to the temperature of the battery 105 falling below a predetermined threshold temperature as the threshold value. For example, when the temperature falls below the threshold temperature, ECU 160 starts the display SOC calculation process. The threshold temperature is, for example, 0° C., but is not limited thereto.

Generally, the lower the battery temperature, the larger the internal resistivity of the battery 105 and the lower the calculation accuracy of the control SOC. Therefore, the battery temperature can appropriately reflect the degree of decrease in the calculation accuracy of the control SOC. Therefore, ECU 160 can appropriately determine a decrease in the calculation accuracy of the control SOC according to the index.

From another viewpoint, since the discharge power (output power) of the battery 105 is basically small as the battery temperature is lower, the traveling driving force of the vehicle 10 is small. This is considered to be substantially the same as a case where the amount of electric power stored in the battery 105 is reduced and the traveling speed (traveling acceleration) of the vehicle 10 is limited. In this case, it may be considered that the calculation of the display SOC lower than the control SOC is useful for causing the user to recognize that the situation is substantially the same as the situation in which the power storage amount is reduced and the traveling speed of the vehicle 10 is limited.

For example, ECU 160 starts a display SOC calculation process immediately when the battery temperature falls below the threshold temperature during traveling, and executes a process for displaying a screen indicating that the battery temperature is low on the display device when the vehicle 10 finishes traveling. Alternatively, ECU 160 may not initiate the display SOC calculation process even if the battery temperature falls below the threshold temperature. In this case, ECU 160 may execute a process for displaying a screen indicating that the battery temperature is low on the display device at the end of travel of the vehicle 10, and may start the display SOC calculation process at the start of the next travel.

Other Modification Examples

The vehicle 10 may be other types of electrified vehicle, such as plug-in hybrid electric vehicle (PHEV). The vehicle 10 further includes an engine capable of generating driving power when the vehicle is a PHEV. The engine is started when the amount of electricity stored in the battery 105 decreases to zero. In PHEV, when the calculation accuracy of the control SOC decreases, the amount of stored electricity decreases to zero earlier than expected even though the user recognizes that the amount of stored electricity of the battery 105 has not yet decreased. As a result, the engine may start unexpectedly. The fact that the calculation accuracy of the control SOC is deteriorated means that, for example, SOC displayed on the display device is not accurate. This can lead to reduced drivability. On the other hand, according to the display SOC calculation process, since the user is motivated to perform external charge, it is possible to avoid an unexpected start-up of PHEV engine caused by a reduction in the amount of electric power storage.

The power supplied from the charging facility 20 may be AC power. In this case, the vehicle 10 may further include an in-vehicle charger (not shown). The charger converts AC power from the charging facility 20 into DC power for charging and supplies the DC power to the battery 105.

The "display device" of the "display system" may be, for example, any of the instrument panel 140, the display device of the HMI device 141, or the display device 305 of the user terminal 30.

It should be considered that the embodiments disclosed above are for illustrative purposes only and are not limitative of the disclosure in any aspect. It is intended that the scope of the disclosure be defined by the appended claims rather than the foregoing description, and that all changes within the meaning and range of equivalency of the claims be embraced therein.

What is claimed is:

1. A display system comprising:
   a display device;
   a power storage device configured to store electric power for traveling of an electrified vehicle;
   a current sensor configured to detect charging and discharging currents of the power storage device; and
   a processor configured to
      calculate a control state of charge of the power storage device based on a detection value of the current sensor, the control state of charge being used for charge and discharge control of the power storage device; and
   calculate an index value indicating a degree of decrease in accuracy of calculating the control state of charge, wherein
      the calculated control state of charge is displayed on the display device while the index value indicates that the decrease in the accuracy of calculating the control state of charge is at or below a threshold value,
      the processor is further configured to begin calculating a display state of charge based on the control state of charge in response to the index value exceeding a threshold value, the display state of charge being calculated as a value lower than the control state of charge,
      the display state of charge is then displayed on the display device instead of the control state of charge, and
      the processor continues the calculating of the control state of charge while the display state of charge is displayed on the display device.

2. The display system according to claim 1, further comprising:
   a storage device configured to store a first relationship between the control state of charge and an open circuit voltage of the power storage device, wherein
      the processor is configured to correct the control state of charge using the first relationship when the control state of charge is equal to or larger than a first reference value or when the control state of charge is smaller than a second reference value that is smaller than the first reference value; and
      the index value is calculated based on an elapsed time since the control state of charge was previously corrected using the first relationship.

3. The display system according to claim 2, wherein
   a difference between the control state of charge and the display state of charge increases as the elapsed time increases.

4. The display system according to claim 2, wherein
   the processor is configured to, when the elapsed time exceeds a threshold time, cause the display device to display a screen prompting a user of the electrified vehicle to fully charge the power storage device.

5. The display system according to claim 1, wherein
   the index value includes a temperature of the power storage device; and
   a state in which the index value exceeds the threshold value includes a state in which the temperature is lower than a threshold temperature serving as the threshold value.

6. The display system according to claim 2, wherein
   the control state of charge is calculated based on a current value detected by the current sensor while the control state of charge is less than the first reference value and equal to or larger than the second reference value.

7. The display system according to claim 2, further comprising:
   a user terminal including a terminal display, wherein
      the processor is configured to cause the user terminal to display a screen on the terminal screen prompting a user of the terminal to fully charge the power storage device of the electrified vehicle.

8. The display system according to claim 3, wherein a magnitude of the difference between the control state of charge and the display state of charge is determined based on an offset error of the current sensor and the length of the elapsed time.

9. The display system according to claim 4, wherein the processor is configured to cause the display device to display the screen prompting the user of the electrified vehicle to fully charge the power storage device upon determining that the elapsed time has exceeded the threshold time.

\* \* \* \* \*